3,830,853
PROCESS FOR THE SIMULTANEOUS PRODUCTION OF STYRENE, ETHYL BENZENE, PHENOL, CRESOLS AND BENZENE
Khachik Egorovich Khcheian, Prospekt Mira 118a, kv. 190; Olga Mikhailovna Revenko, ulitsa Chkalova 48a, kv. 53; Alla Viktorovna Borisoglebskaya, Novoslobodskaya ulitsa 52, kv. 33; and Dina Lvovna Fishman, Dubininskaya ulitsa 51, kv. 19, all of Moscow, U.S.S.R.
No Drawing. Filed Apr. 21, 1971, Ser. No. 136,244
Claims priority, application U.S.S.R., Apr. 27, 1970, I 425602
Int. Cl. C07c 37/00, 37/12
U.S. Cl. 260—621 G      12 Claims

ABSTRACT OF THE DISCLOSURE

A process for the simultaneous production of styrene, ethyl benzene, phenol, cresols and benzene comprising an interaction of toluene with a lower paraffin hydrocarbon at a temperature of 600–900° C. and a space velocity of 2000–1000 hour$^{-1}$ in the presence of an initiating reagent, e.g. oxygen or an oxygen-containing gas. The oxygen content in the starting mixture is from 1 to 30 percent by volume. The molar ratio of the toluene to the lower paraffin hydrocarbon is from 2:1 to 1:20.

---

The present invention relates to a process for the simultaneous production of styrene, ethyl benzene, phenol, cresols and benzene which are broadly used in the organic synthesis industry.

Styrene is finding an ever increasing use in the production of impact polystyrene, foam plastics and synthetic rubber.

Ethyl benzene is a starting substance for preparing styrene. It is also used as a high-octane addition to motor fuel.

Phenol is used in the production of synthetic dyes, resins, explosives and in the pharmaceutical industry as well.

Cresol isomers are broadly used for producing synthetic resin, dyes and disinfectants.

Benzene is a valuable solvent. It is used in the production of synthetic rubber, plastics and high-octane additions to motor fuel. Benzene is also used as raw material in the aniline-dye and pharmaceutical industries.

Styrene is commercially obtained by multistage conversions of benzene. Benzene is alkylated with ethylene in the presence of aluminium chloride or boron fluoride. The obtained ethyl benzene is converted to styrene by catalytic dehydrogenation at a temperature of 450–600° C. The ethyl benzene may be also oxidized to acetophenone which is reduced to methyl-phenyl-carbinol and the latter is dehydrated to produce styrene (J. Prescoff, Chem. Eng., 1969, 76, No. 12, 48). This multistage process requires complicated manufacturing equipment and the use of scarce olefine hydrocarbon as a starting material.

There is also known a process for preparing styrene and ethyl benzene by interacting toluene with an alkane having 1,3 or 4 carbon atoms at a temperature of 1000–1200° C. (U.S. Pat. No. 3,396,206). The conversion of toluene in this process is about 10–25 percent and the yields of styrene and ethyl benzene are in the range of 60–73 percent for the reacted toluene. The disadvantage of the mentioned process is a low conversion of toluene and a high temperature level necessary for the reaction.

The demand in benzene for the production of styrene and phenol and for some other benzene-consuming processes considerably exceeds the resources of the oil chemical industry. In order to cover the deficiency in benzene, the industrial processing is now provided with toluene the resources of which still remain incompletely utilized.

The industrial consumption of styrene, ethyl benzene, phenol, cresols and benzene is constantly growing. At the present time there is no such a process which could provide the simultaneous production of the mentioned products.

Hence, there existed a problem to develop a method for the simultaneous production of styrene, ethyl benzene, phenol, cresols and benzene in a single-stage process on the base of toluene.

According to the present invention, toluene is caused to interact with a lower paraffin hydrocarbon in the presence of an initiating reagent at a temperature of 600–900° C. It is preferred to carry out the reaction at a temperature of 670–800° C. In the part of an initiating reagent there may be used oxygen or any oxygen-containing gas, e.g. air.

As for the paraffin hydrocarbons methane, ethane, propane or mixtures thereof are used.

The process is carried out at a normal pressure and at a space velocity of 2000–10000 hour$^{-1}$, preferably 3500–8000 hour$^{-1}$.

The oxygen content in the starting mixture is about 1–30 percent by volume. The molar ratio of toluene to a paraffin hydrocarbon in the starting mixture may vary in the range from 2:1 to 1:20. The preferable molar ratio is from 1:5 to 1:10.

It is possible to carry out the process in the presence of an inert agent, e.g. nitrogen, carbon dioxide or water vapour. The presence of an inert agent makes it possible to carry out the process under mild conditions and also reduces the possibility of resin formation.

The yields of final products depend on manufacturing conditions of the process and the lower paraffin hydrocarbon being used. Thus, for instance, to improve the yield of benzene, ethane is used as a lower paraffin hydrocarbon. When the relationship of toluene and methane is close to an equimolecular ratio the yields to benzene and phenol are increased.

The improved yields of styrene and ethyl benzene may be achieved under the reaction of toluene with an excess amount of methane. In some cases, for instance at final temperature limits, it is possible to change the relationship between phenol and cresols in the reaction products.

The final products are extracted from the reaction mixture by means of a rectification. The total yield of the final products is up to 95 percent relatively to the reacting toluene.

The present invention provides a 40 percent conversion of toluene and makes it possible to obtain simultaneously in a single-stage process 14–25 percent of styrene, 5–15 percent of ethyl benzene, 10–20 percent of phenol, 6–10 percent of cresols and 30–60 percent of benzene relatively to the reacting toluene.

In practice the process is carried out as follows.

An amount of toluene vapours is mixed with a lower paraffin hydrocarbon heated to a temperature close to that of the reaction and with some amounts of oxygen or an oxygen-containing gas, e.g. air. The obtained vapour-gas mixture in the above-mentioned molar relationship is passed through a reactor at a space velocity from 2000 hour$^{-1}$ up to 1000 hour$^{-1}$. The temperature level in the reactor is maintained at 600–900° C. If the reaction is carried out in the presence of an inert agent for instance water vapour or nitrogen, the mentioned agent which is previously heated is fed into the reactor simultaneously with the initial mixture. The present invention is further illustrated by the following examples:

EXAMPLE I

A vapour-gas mixture of toluene, methane, oxygen and water in a molar ratio of 1:8:1.44:1.5 was passed through a quartz reactor having an inner diameter of 22 mm. and a reaction zone of 100 mm. long at a space velocity of 3280 hour$^{-1}$ and a temperature of 750° C.

The toluene conversion was 36.0 percent.

Therewith the following product yields were obtained relatine to the reacting toluene: 23.2 percent of styrene, 12.1 percent of ethyl benezne, 12.6 percent of phenol, 7.35 percent of cresols and 35.0 percent of benzene.

The total yield of the reaction products was 90.25 percent relatine to the reacted toluene.

EXAMPLE II

A vapour-gas mixture of toluene, methane, oxygen and water in a molar ratio of 1:9:1.09:1.5 was passed through a reactor at a space velocity of 3480 hour$^{-1}$ and a temperature of 750° C.

The toluene conversion was 34.8 percent.

The product yields relatine to the reacting toluene were the following: 18.3 percent of styrene, 14.5 percent of ethyl benzene, 11.7 percent of phenol, 7.35 percent of cresols and 32.0 percent of benzene.

The total yield of the reaction products was 83.85 percent.

EXAMPLE III

A vapour-gas mixture of toluene, methane, oxygen and water in a molar ratio of 1:6:1.1:1.5 was passed through a reactor at a space velocity of 2600 hour$^{-1}$ and a temperature of 740° C.

The toluene conversion was 35.5 percent.

The product yields relatively to the reacting toluene were the following: 17.2 percent of styrene, 13.0 percent of ethyl benzene, 14.8 percent of phenol, 6.1 percent of cresols and 41.5 percent of benzene.

The total yield of the reaction products was 89.6 percent.

EXAMPLE IV

A vapour-gas mixture of toluene, methane, oxygen and water in a molar ratio of 1:2:1.1:0.7 was passed through a reactor at a space velocity of 2580 hour$^{-1}$ and a temperature of 700° C.

The toluene conversion was 39.0 percent.

The product yields relative to the reacting toluene were the following: 12.3 percent of styrene, 4.37 percent of ethyl benzene, 19.2 percent of phenol, 9.05 percent of cresols and 55.0 percent of benzene.

The total yield of the reaction products was 99.92 percent.

EXAMPLE V

A vapour-gas mixture of toluene, ethane and oxygen in a molar ratio of 1:4:1.1 was passed through a reactor at a space velocity of 2060 hour$^{-1}$ and a temperature of 750° C.

The toluene conversion was 37.0 percent.

The product yields relative to the reacting toluene were the following: 16.6 percent of styrene, 2.9 percent of ethyl benzene, 11.3 percent of phenol, 5.7 percent of cresols and 58.0 percent of benzene.

The total yield of the reaction products was 94.5 percent.

EXAMPLE VI

A vapour-gas mixture of toluene, propane, oxygen and water in a molar ratio of 1:8:1.1:1.5 was passed through a reactor at a space velocity of 3180 hour$^{-1}$ and a temperature of 728° C.

The toluene conversion was 24 percent.

The product yields relative to the reacting toluene were the following: 21.5 percent of styrene, 13.6 percent of ethyl benzene, 5.6 percent of phenol, 7.0 percent of cresols and 43.0 percent of benzene.

The total yield of the reaction products was 90.7 percent.

EXAMPLE VII

A vapour-gas mixture of toluene, ethane, oxygen and water in a molar ratio of 1.97:1:2.2:2.57 was passed through a reactor at a space velocity of 2114 hour$^{-1}$ and a temperature of 725° C.

The toluene conversion was 32.35 percent.

The product yields relative to the reacting toluene were the following: 10.82 percent of styrene, 4.48 percent of ethyl benzene, 14.06 percent of phenol, 8.19 percent of cresols and 57.9 percent of benzene.

The total yield of the reaction products was 95.49 percent.

EXAMPLE VIII

A vapour-gas mixture of toluene, methane and air in a molar ratio of 1:3.92:6.85 was passed through a reactor at a space velocity of 3164 hour$^{-1}$ and a temperature of 725° C.

The toluene conversion was 30.7 percent.

The product yields relative to the reacting toluene were the following: 14.4 percent of styrene, 5.5 percent of ethyl benzene, 12.05 percent phenol, 7.8 percent of cresols and 53.4 percent of benzene.

The total yield of the reaction products was 93.19 percent.

EXAMPLE IX

A vapour-gas mixture of toluene, methane and oxygen in a molar ratio of 1:3.57:1.48 was passed through a reactor at a space velocity of 3000 hour$^{-1}$ and a temperature of 650° C.

The toluene conversion was 12.21 percent.

The product yields relative to the reacting toluene were the following: 11.52 percent of styrene, 18.93 percent of ethyl benzene, 11.93 percent of phenol and 33.33 percent of benzene.

The total yield of the reaction products was 75.72 percent.

EXAMPLE X

A vapour-gas mixture of toluene, methane, oxygen and water in a molar ratio of 1:15:0.17:2.28 was passed through a reactor at a space velocity of 3607 hour$^{-1}$ and a temperature of 850° C.

The toluene conversion was 34.8 percent.

The product yields relative to the reacting toluene were the following: 6.17 percent of styrene, 3.83 percent of ethyl benzene, 3.2 percent of cresols and 71.6 percent of benzene.

The total yield of the reaction products was 84.8 percent.

EXAMPLE XI

A vapour-gas mixture of toluene, methane, oxygen and water in a molar ratio of 1:5.93:1:0.82 was passed through a reactor at a space velocity of 8400 hour$^{-1}$ and a temperature of 750° C.

The toluene conversion was 29.1 percent.

The product yields relative to the reacting toluene were the following: 16.48 percent of styrene, 14.1 percent of ethyl benzene, 10.22 percent of phenol, 5.7 percent of cresols and 46.07 percent of benzene.

The total yield of the reaction products was 92.5 percent.

EXAMPLE XII

A vapour-gas mixture of toluene, methane, oxygen and nitrogen in a molar ratio of 1:4:1.1:5.3 was passed through a reactor at a space velocity of 3170 hour$^{-1}$ and a temperature of 725° C.

The toluene conversion was 31.0 percent.

The product yields relative to the reacting toluene were the following: 14.4 percent of styrene, 5.54 percent of ethyl benzene, 12.05 percent of phenol, 7.8 percent of cresols and 53 percent of benzene.

The total yield of the reaction products was 93.2 percent.

EXAMPLE XIII

A vapour-gas mixture of toluene, methane, ethane, oxygen and water in a molar ratio of 1:2.8:1.2:1.08:1.02 was passed through a reactor at a space velocity of 1930.5 hour$^{-1}$ and a temperature of 725° C.

The toluene conversion was 32.6 percent.

The product yields relative to the reacting toluene were the following: 17.48 percent of styrene, 5.52 percent of ethyl benzene, 9.51 percent of phenol, 6.13 percent of cresols and 56.12 percent of benzene.

The total yield of the reaction products was 94.76 percent.

EXAMPLE XIV

A vapour-gas mixture of toluene, methane, ethane, oxygen and water in a molar ratio of 1:2.06:2.06:1.08:1.48 was passed through a reactor at a space velocity of 2059 hour$^{-1}$ and a temperature of 725° C.

The toluene conversion was 33.3 percent.

The product yields relative to the reactive toluene were the following: 18.62 percent of styrene, 6.0 percent of ethyl benzene, 9.31 percent of phenol, 6.0 percent of cresols and 54.95 percent of benzene.

The total yield of the reaction products was 88.88 percent.

EXAMPLE XV

A vapour-gas mixture of toluene, methane, ethane, oxygen and water in a molar ratio of 1:3.72:0.38:1.08:1.39 was passed through a reactor at a space velocity of 2054 hour$^{-1}$ and a temperature of 725° C.

The toluene conversion was 35.6 percent.

The product yields relative to the reacting toluene were the following: 19.09 percent of styrene, 8.14 percent of ethyl benzene, 8.7 percent of phenol, 5.02 percent of cresols and 51.39 percent of benzene.

The total yield of the reaction products was 92.34 percent.

What is claimed is:

1. A process for the simultaneous production of styrene, ethyl benzene, phenol, cresols and benzene comprising reacting toluene with a lower paraffin hydrocarbon having from 1 to 3 carbon atoms in the presence of an oxygen-containing gas which provides an oxygen content in the starting mixture from 1 to 30 percent by volume at a temperature of 600–900° C. and a space velocity of 2000–10000 hour$^{-1}$ in a molar ratio of the toluene to the lower paraffin hydrocarbon from 2:1 to 1:20.

2. The process as defined in claim 1 wherein said oxygen-containing gas is oxygen.

3. The process as claimed in claim 1, wherein said oxygen-containing gas is air.

4. The process as defined in claim 1 wherein the process is carried out in the presence of an inert agent.

5. The process as defined in claim 4, wherein said inert agent is nitrogen.

6. The process as claimed in claim 4, wherein said inert agent is water vapor.

7. The process as claimed in claim 4, wherein said inert agent is carbon dioxide.

8. The process as defined in claim 1, wherein said lower paraffin hydrocarbon is a member selected from the group consisting of methane, ethane, propane, and mixtures thereof.

9. The process as claimed in claim 8, wherein said oxygen-containing gas is oxygen, said temperature is 600–800° C., said space velocity is 3500–8000 hour$^{-1}$, and said molar ratio is from 1:1 to 1:15.

10. The process as claimed in claim 9, wherein said hydrocarbon is methane.

11. The process as claimed in claim 9, wherein said hydrocarbon is ethane.

12. The process as claimed in claim 9, wherein said hydrocarbon is propane.

References Cited

UNITED STATES PATENTS 2,440,233    4/1948    Kriebel et al. _____ 260—621 G

LEON ZITVER, Primary Examiner

N. MORGENSTERN, Assistant Examiner

U.S. Cl. X.R.

260—668 B, 669 R, 671 A, 672 NC, 671 G